Oct. 28, 1924.

W. G. LEHMANN ET AL 1,512,990

METHOD AND MEANS FOR FABRICATING SPRING STRUCTURES

Filed July 30, 1923     7 Sheets-Sheet 2

FIG. 2

Inventors
W. G. Lehmann
John Rein

Attorneys

Oct. 28, 1924.
W. G. LEHMANN ET AL
1,512,990
METHOD AND MEANS FOR FABRICATING SPRING STRUCTURES
Filed July 30, 1923
7 Sheets-Sheet 5

Inventors
W. G. Lehmann
John Rein

Oct. 28, 1924.  1,512,990
W. G. LEHMANN ET AL
METHOD AND MEANS FOR FABRICATING SPRING STRUCTURES
Filed July 30, 1923  7 Sheets-Sheet 6

Inventors
W. G. Lehmann
John Rein

Oct. 28, 1924.  
W. G. LEHMANN ET AL  
1,512,990  
METHOD AND MEANS FOR FABRICATING SPRING STRUCTURES  
Filed July 30, 1923  7 Sheets-Sheet 7

Inventors  
W. G. Lehmann  
John Rein  
Attorneys

Patented Oct. 28, 1924.

1,512,990

UNITED STATES PATENT OFFICE.

WESLEY G. LEHMANN AND JOHN REIN, OF CLEVELAND, OHIO, ASSIGNORS TO DAVID T. OWEN, OF CLEVELAND, OHIO.

METHOD AND MEANS FOR FABRICATING SPRING STRUCTURES.

Application filed July 30, 1923. Serial No. 654,554.

*To all whom it may concern:*

Be it known that we, WESLEY G. LEHMANN, a citizen of the United States, and JOHN REIN, a citizen of Latvia, both residing at Cleveland, in the county of Cuyahoga and State of Ohio, have invented certain new and useful Improvements in a Method and Means for Fabricating Spring Structures, of which the following is a specification.

Our invention relates to a method and means of fabricating spring structures, particularly spring mattresses, cushions, bed springs and the like, and in general our object is to assemble and unite a multiple number of coiled springs together in a rapid and effective way and at a considerable saving in cost and expense as compared with common practices. It is also our aim to provide a strong, durable and noiseless tie or union between the springs, and to produce such tie or unions by a sequence of steps involving the formation of single metal clips successively from a strip of metal and the joint indentation of the clips and springs simultaneously and automatically, all as hereinafter shown and described and more particularly pointed out in the claims.

In the accompanying drawings.

Heretofore, in fabricating a spring mattress or cushion of coiled wire springs of either the hour glass, conical or straight type, the general practice has been to tie or unite the springs together singly and successively by hand operations, regardless of the kind of tie or union employed. Such proceedings are slow and costly and the completed spring structure is not tied or united at all places with uniform security and effectiveness, and where metallic ties or connections are resorted to, the joints are loose or easily distorted and objectionable free play and noise results. In order to expedite and lessen the cost of production and to produce a noiseless spring structure of exceptional durability and strength, we form and produce a tie or clip A from a strip of metal and unite two wire springs B together in substantially one and the same operation; and by repeating this operation join a given number of springs successively together, in a straight row. Then in the same manner, we unite the separate springs of two rows of similarly fabricated springs together, and so on until the desired number of springs to make a spring structure of a given size is secured firmly and permanently together. In the present instance we also effect an absolutely secure and noiseless union between the springs by jointly upsetting the metal clips and the wire of each spring into interlocking union and engagement all as will hereinafter more fully appear.

Figure 1:
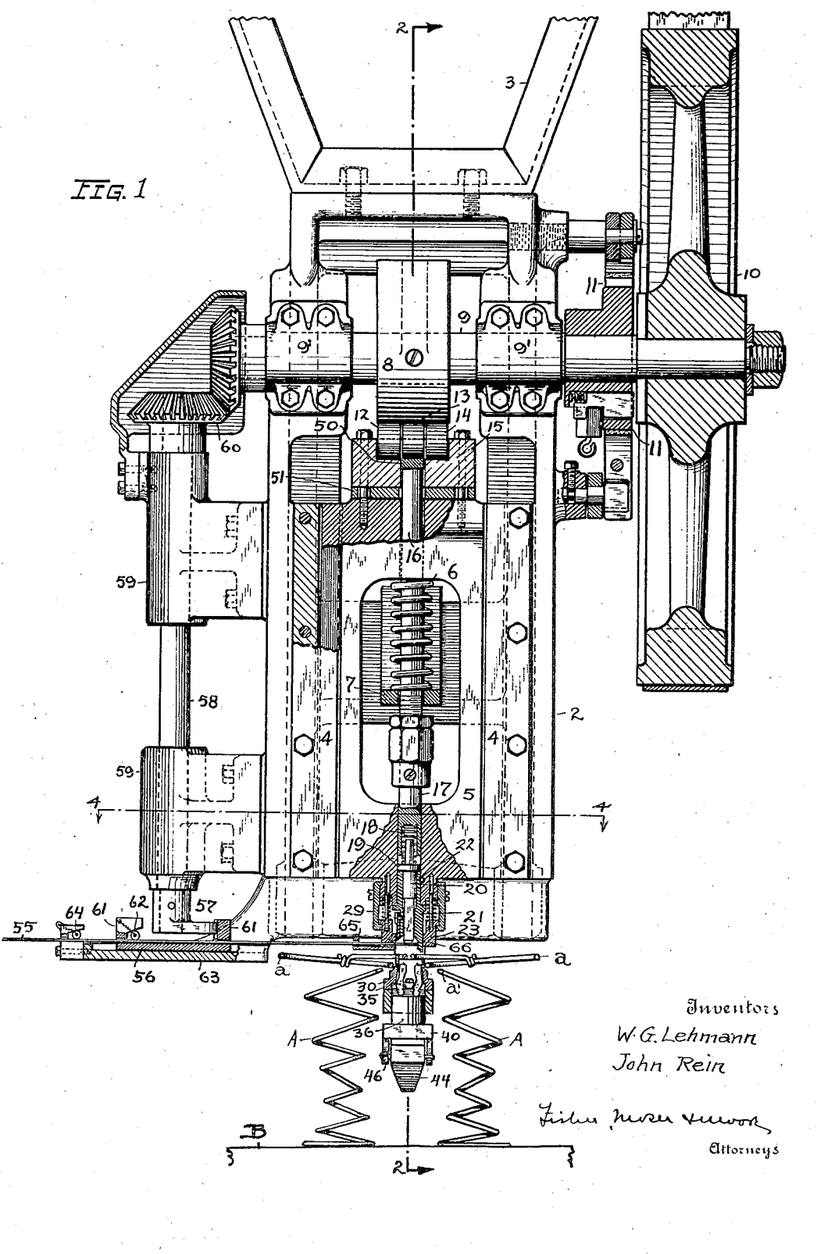
Fig. 1 is a front elevation, with portions in section, of my improved machine or apparatus for fabricating spring structures.
Figure 2:
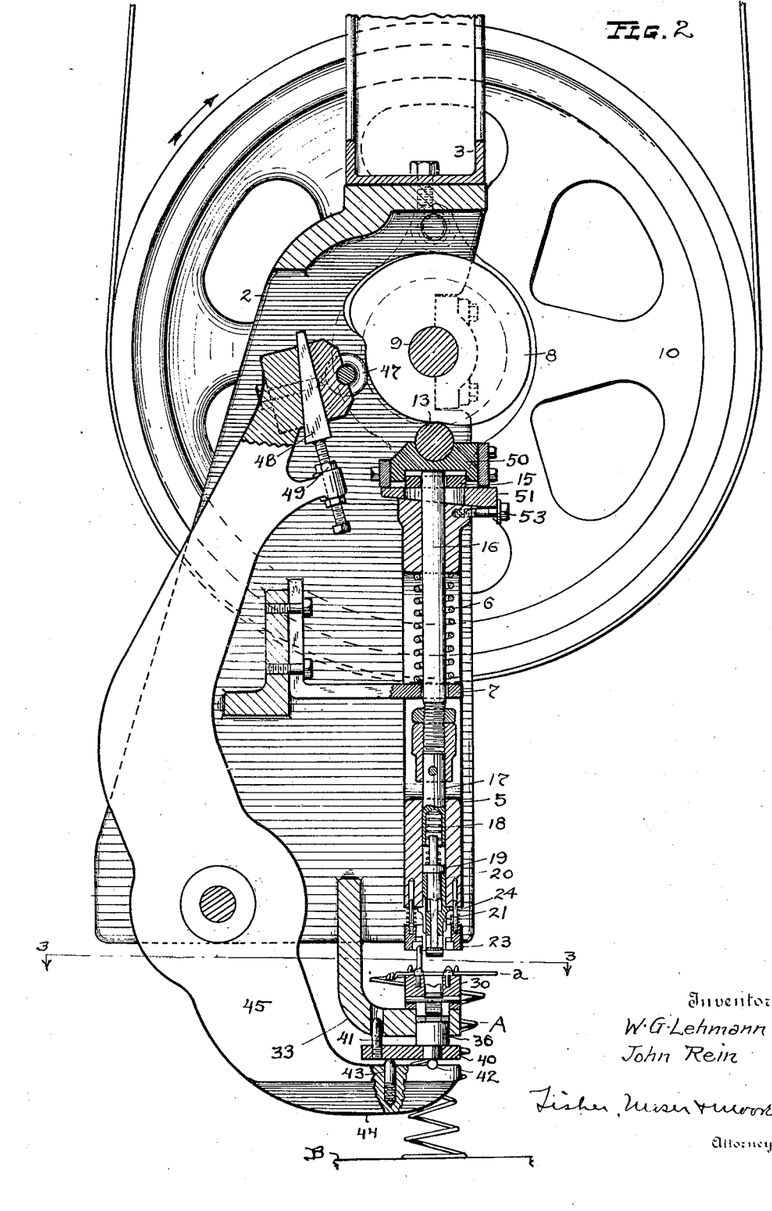
Fig. 2 is a vertical section centrally through the machine on line 2—2 of Fig. 1.

As exemplified in the drawings, we have devised a machine or apparatus embodying a cast-iron frame 2 adapted to be suspended from a suitable overhead support, for example a hanger 3 made of channel iron as shown in Figs. 1 and 2. Frame 2 is provided with channeled guides 4 between which a slidable yoke or head 5 is adapted to reciprocate vertically, a heavy coiled spring 6 being mounted within the yoke in rest position upon a stationary arm 7 to hold this yoke or slidable member 5 in a raised and operative position relatively to a cam 8. A cross-shaft 9 journaled in boxes 9' upon frame 2 carries cam 8, a pulley 10, and suitable clutch mechanism 11, whereby the shaft may be given a single rotation at the election of the operator. This starting and stopping mechanism is not claimed herein and may be of any suitable kind, such for example as used in punch presses and other machines where only a single stroke is desired and starting is effected by a lever or treadle under the control of the operator and where stopping is effected automatically upon the return of the operating parts to starting position. In the present machine the raised position of slide 5 is the starting position, where cam 8 is engaged at its low points by three rollers 12, 13 and 14 carried by a divided block 15 bolted to the upper end of slide 5. The middle roller 13 operates a central rod 16 independently of slide 5 during a brief interval in the movement of the slide, and an adjustable extension 17 at the lower end of rod 16 has a socket at its bottom adapted to seat a compression spring 18 which serves to uphold rod 16 and keep roller 13 in working engagement with cam 8. Spring 18 rests upon collar 19 of a forming and ejecting plunger 20 which is movably confined within a clip forming and cutting die 21 fixed centrally within the lower end of yoke or slide 5 by means of a cross pin 22. A square clamping ring or block 23 is slidably sleeved over the lower square end of die 21, and is pressed downwardly apart from the bottom of slide 5 by a set of coiled springs 24 which are sleeved over guide pins 25 and adapted to be compressed into round pockets 26 within the channeled neck or reduced extension 27 of slide 5. A pair of flanged plates 29 affixed to opposite sides of extension 27 limits the downward movement of clamping block 23, which functions as a stripping member and as a clamping holder for the pair of wire springs A—A being operated upon.

In operations, the circular top loops $a$ if these springs are first seated in definitely spaced relations upon a lower clamping block 30 having a flat rectangular top provided with upwardly-extending pointed projections or pins 31 at its corners to engage and hold the respective wire loops $a$—$a$ of the two springs A—A in juxtaposition or side by side in the same horizontal plane. The next sub-coil or convolution $a'$ of each spring, which is of lesser diameter than loop $a$, is seated within a concavity or curved recess 32 in the side wall of block 30, thereby definitely spacing the two loops $a$—$a$ apart upon the top of the block. The remaining coils of the spring stand apart from block 30 and its support which consists of an integral arm or fixed part 33 extending downwardly and forwardly from main frame 2, see Fig. 2. Block 30 is formed with a rectangular opening 34 through its center within which a pair of bent die members or fingers 35—35 have limited vertical and lateral movement and a reciprocable die holder 36 extends upwardly through stationary arm 33 to support said dies or fingers 35. Each finger has a rounded pivot end 37 seated within a rounded groove 38 within the top of holder 36, and a flat U-shaped spring 39 spreads the two die fingers 35 apart at their upper ends. Holder 36 is mounted upon a base plate 40 having an upright pin 41 engaged with arm 33, and plate 40 is seated at its front end upon a round bearing piece 42 and at its rear end upon a spring pressed bolt 43, carried by the foot end 44 of an oscillatory lever 45 which is pivotally supported between the sides of main frame 2. Plate 40 also has depending hooks 46 connected with foot end 44, and the upper end of lever 45 is provided with a roller 47 opposite cam 8, which cam at certain points in its revolution tilts lever 45 on its pivot, thus raising its foot end 44 and forcing holder 36 and its dies 35 upwardly to co-act with the upper forming die 21 and plunger die 20. The working position of holder 36 and its dies in respect to upper die 21, may be varied by adjustably setting roller 47 in respect to cam 8 through the medium of a wedge 48 and a set screw 49 carried by lever 45, see Fig. 2. Roller 13 beneath cam 8 is supported within a saddle 50 between the blocks 15 which are seated upon a wedge 51 at the top of slide 5, and rollers 12 and 14 rest within bearing blocks 15 which are also seated upon wedge 51 and fastened to slide 5, see Figs. 1 and 2. A set screw 53 is used to shift wedge 51 and effect an adjustable setting of slide 5 and the parts carried thereby relatively to lower clamping block 30.

Figures 5, 6, 7:
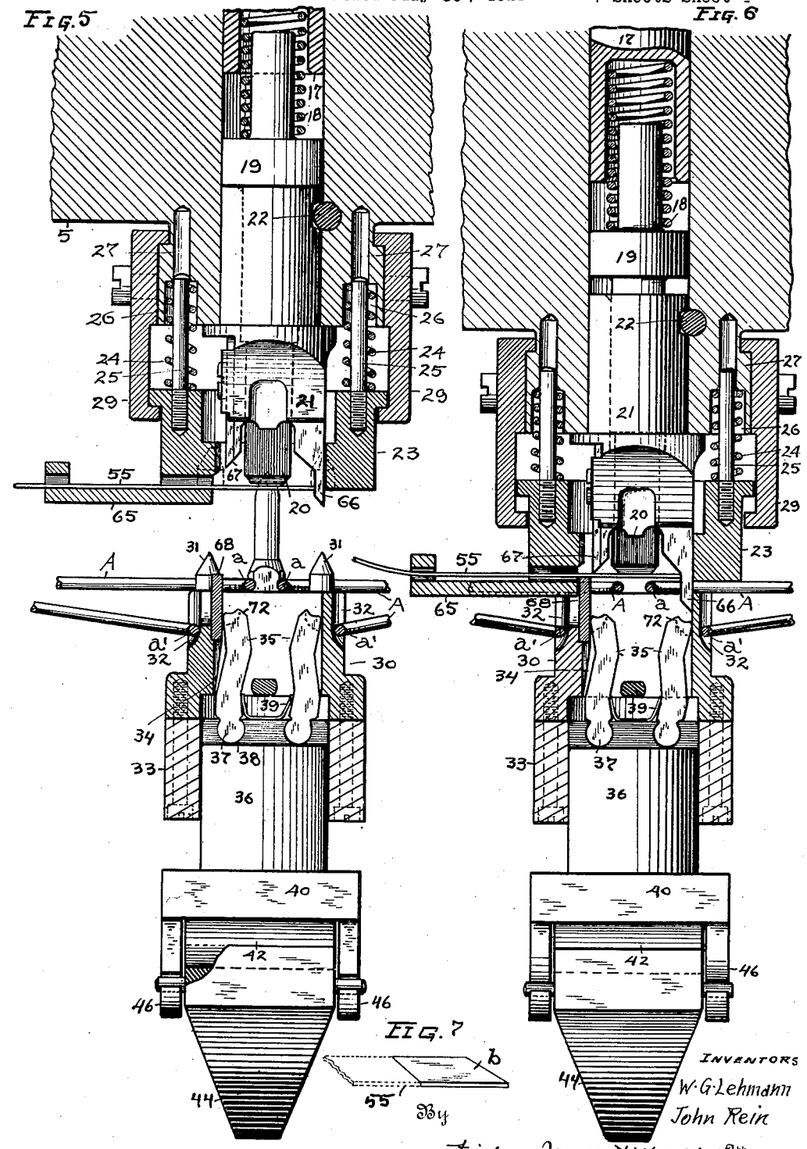
Fig. 5 is an enlarged front view and vertical section of the lower part of the machine showing the dies and clamping members in substantially the same position as in Fig. 1.
Fig. 6 is a view corresponding to Fig. 5, but showing the upper die lowered and the upper clamping member engaged with the top coils or convolutions of two coiled springs, only a portion of the springs being shown for lack of space.
Fig. 7 is a perspective view of the blank or strip for which a clip is made.
Figures 8, 9, 10, 11:
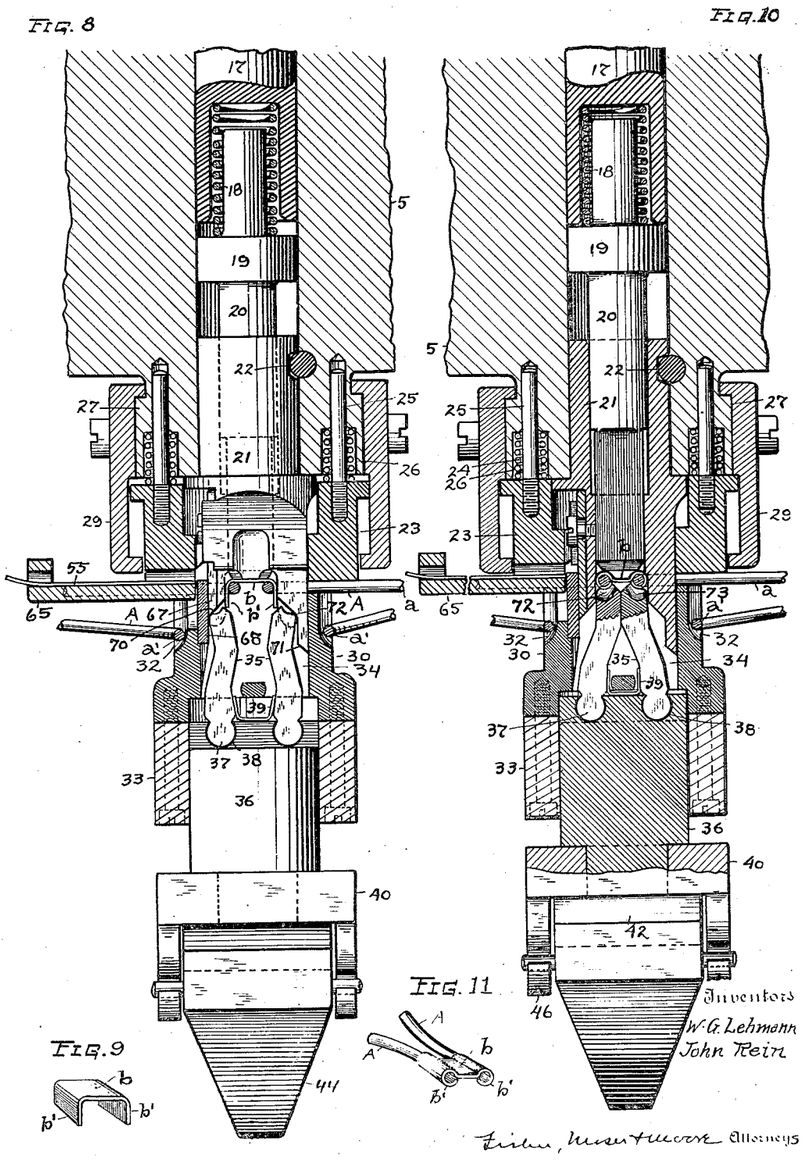
Fig. 8 is a sectional view corresponding to Figs. 5 and 6, showing the forming dies shaping the blank into a clip around the wire springs.
Fig. 9 is a perspective view of the partially formed clip at the stage of operation illustrated in Fig. 8.
Fig. 10 is a sectional view corresponding to Fig. 8, showing a still further advanced position of the operating parts.
Fig. 11 is a perspective view of the clip as it appears wrapped around the wire springs at this stage in operations.

When the machine is started the initial rotation of crank shaft 9 is utilized to feed a narrow strip 55 of thin metal between the dies over the tops of the two wire springs A—A seated upon clamping block 30. This result is effected by means of a reciprocable feeding device 56 operated by a crank 57 fixed upon a rotatable shaft 58 journaled in brackets 59 at one side of frame 2 and driven by bevel gears 60 deriving their motion from cam shaft 9, see Fig. 1. Feeding device 56 consists of a plate having vertical lugs 61 adapted to be engaged by crank 57, and the metal strip 55 passes through the base of these lugs, one of which is beveled to effect wedging of a gripping roller 62 against the strip upon a forward feeding movement of plate 56. This plate slides back and forth upon a lateral extension 63 of frame 2 and a second wedging roller 64 is provided at the outer end of extension 63 to grip and prevent strip 55 from backing up upon the idle stroke of plate 56. The strip feeding device is located more or less remotely from the dies to permit the portion fed in advance of the device to flex freely and to move up and down with the upper clamping block 23 which is provided with a lateral support and guide 65 for the free end of the strip 55, see Figs. 1 and 5. The forward movement of the strip is relatively short and limited to the length of the blank to be cut for use as a clip, and flanges, marginal portions, or a depending flange 66 at one side of die member 21 forms a stop which is engaged by the end of the strip when it is fed forward beneath die 21. In this position of parts, plunger 20 is located centrally above the stock projected into the central opening within the upper clamping block 23 substantially as illustrated in Figs. 5 and 6, and the bottom of the plunger forms a backing for this extended part of the strip so that as main slide 5 descends the strip will be carried downward with die 21 until clamping block 23 engages the wire loops —a— of both springs A—A and is arrested in its movement while the upper die 21 continues to move downward and the springs 24 above the block are compressed and caused to exert an increasing clamping pressure upon the block and the wire loops —a—. During this clamping proceeding the advanced portion of strip 55 is sheared off beneath plunger 20 by a knife blade 67 removably affixed to one side of die 21. A complementary shearing blade 68 is mounted within the lower clamping block 30 in line with knife blade 67 and when shearing takes place the piece of strip to be cut off is backed by plunger 20 and its compression spring 18. Thus as die 21 descends and strip 55 is carried to and arrested by shearing blade 58, the descent of plunger 20 is checked until spring 18 is compressed and knife blade 67 engages the top of strip 55, see Fig. 6. Then as die 21 continues to descend the strip is cut and a rectangular blank —b— of the requisite length is superposed upon and across the juxtaposed circular segmental portions of loops a—a which span the upper end of the rectangular opening 34 in lower block 30. The next action involves shaping of blank —b— into an inverted U and the wrapping of the legs b' of the U blank around the round loop wires a—a. This operation takes place as the stop flange 66 and knife blade 67 on upper die 21 enter the central opening in lower clamping block 30, and forming of the right-angled legs b' is facilitated by the beveled face 70 of the knife blade and a corresponding but reversely beveled face 71 at the inner side of stop flange 66. When the U-shaped blank is formed, its depending legs b' extend downwardly on straight parallel lines between the base ends of stop flange 66 and the opposite depending portion of the die to which knife blade 67 is fastened, and the bottom edge portions of legs b' project more or less beyond the base ends of beveled faces 70—71, thereby permitting the beveled upper ends of the two pivoted fingers 35—35 to strike said beveled faces and to project outside of and engage the free ends of legs b' see Fig. 8. Then as die 21 continues to descend said fingers 35 are forced toward each other by the beveled faces 70—71 and the legs are bent inwardly toward each other and partly wrapped underneath the two wires a—a. A more complete wrapping and rigid connection is then effected: that is to say, the flat middle portion of blank b is projected downwardly between the two wires and the free ends of the legs b' forced upwardly and wrapped tightly around the wires substantially as shown in Figs. 10 and 11. This result is accomplished by plunger 20 and fingers 35 when collar 19 at the upper end of the plunger engages the operating member 17 for the plunger, and when the two fingers 35 move inward and abut and bring their curved end edges 72 against the free ends of legs b' substantially as shown in Fig. 10. In this position of the parts the upper clamping block 23 is directly engaged with the bottom end of slide 5 and the slide may be considered at the end of its downward movement and at rest, with plunger 20 in an advanced position relatively thereto which is brought about by the higher middle portion 8' of cam 8.

Figures 12, 13, 14:
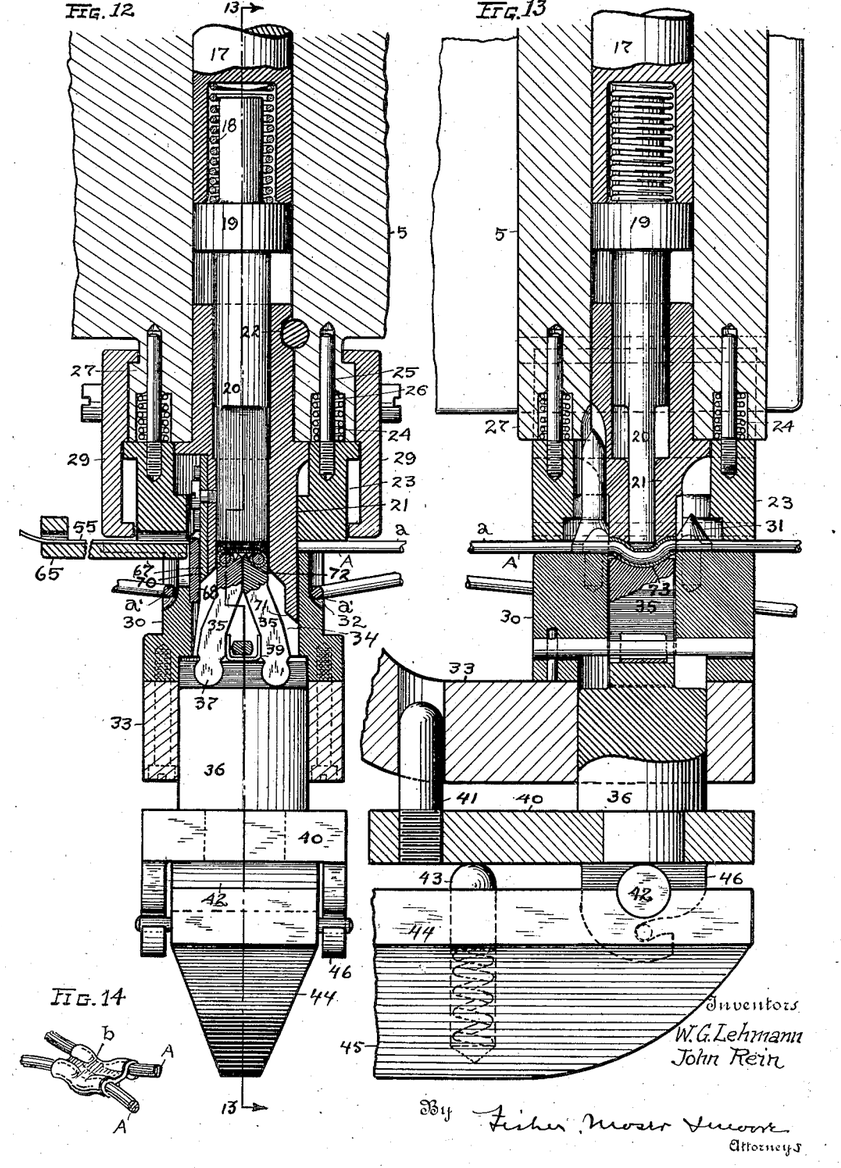
Fig. 12 is a view corresponding to Figs. 8 and 10, showing the final step of indenting both wire springs and the clip.
Fig. 13 is a vertical section on line 13—13 of Fig. 13, showing the same parts in the same position.
Fig. 14 is a perspective view of the finished tie or union shown in section in Figs. 12 and 13.
Figures 15, 16, 17, 18, 19, 20, 21, 22, 23, 24:
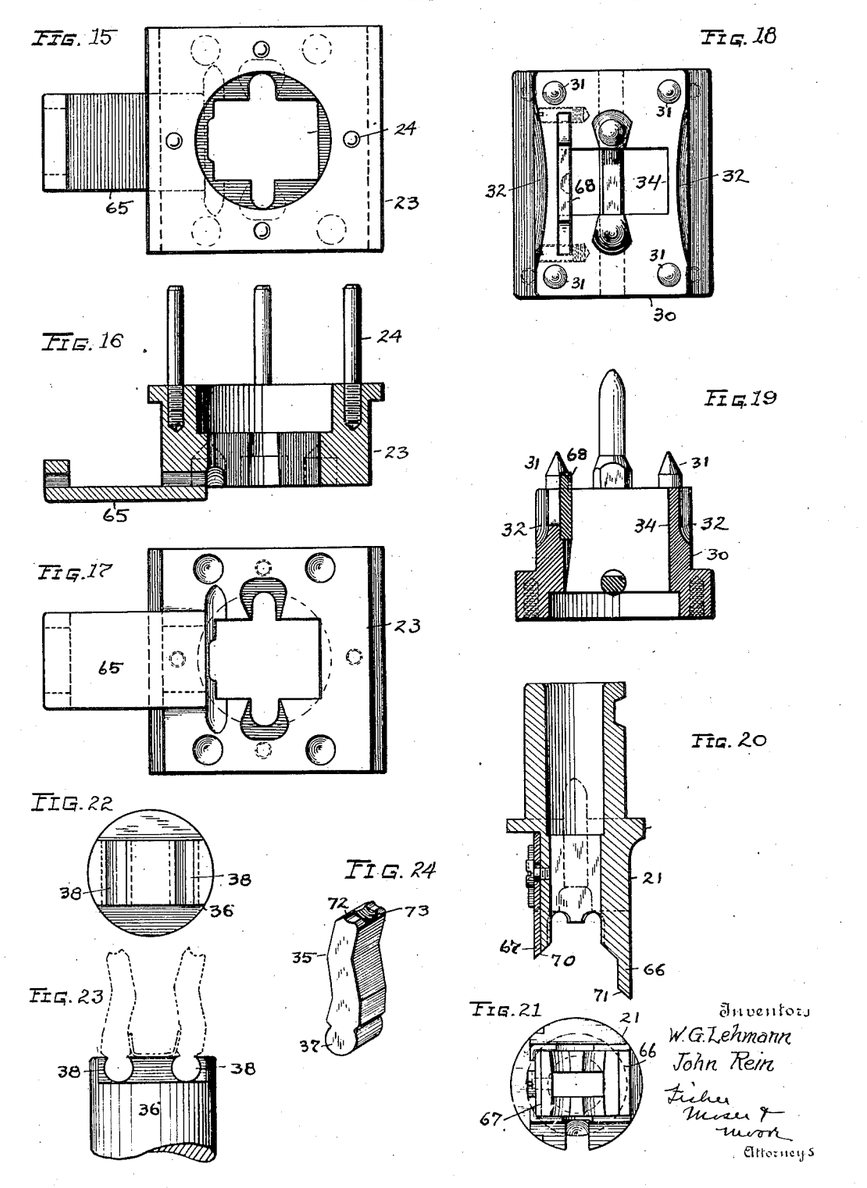
Fig. 15 is a top view of the upper clamping block which is used with the upper die.
Figs. 16 and 17, are section and bottom views respectively of the same block.
Fig. 18 is a top view of the lower clamping block.
Fig. 19 is a vertical section transversely on the center line of said block.
Fig. 20 is a central section longitudinally of the cutting and forming die.
Fig. 21 is a bottom view thereof.
Figs. 22 and 23 are top and side views, respectively of the holder for the die fingers.
Fig. 24 is a perspective view of one of the die fingers removed from said holder.

During the latter part of the wrapping and uniting steps just described, an upsetting operation also takes place to produce a more durable and effective tie or union between the connected parts. In other words, the wrapped portions of the clip and the wires themselves are jointly indented or upset to lock the wires and clip rigidly together, especially where wrapped around the wire. This result is effected by forcing the die fingers 35 upwardly a short distance by oscillating lever 45 during the latter part or end of the downward stroke of slide 5 and plunger 20, the relative position of the die fingers at the beginning of this upsetting movement being substantially as shown in Fig. 10 where the rounded concavities 73 at the ends of the fingers are still unoccupied and open and as appears before each wire is indented transversely. In Figs. 12, 13 and 14, the clip and wires therein are shown indented, Fig. 12 showing the die fingers raised to the limit, and Fig. 13 showing the parts in the same position and the wrapped portion of the clip together with a wire —a— indented midway between the longitudinal sides of the clip. This indentation is produced in both wires at the same time, and the finished result is shown in Fig. 14. However, the die may be constructed to indent only one of the wires, if a partly pivotal connection or union between two wire springs is desired. As shown, the clip is indented longitudinally between the two wires, the curled portions of the clip being spaced apart and the two wires being permanently segregated and clenched independently to the clip, and also across or transversely of both wires, making an exceptionally strong and durable metal tie or connection for the springs and one which will not open up, loosen, rattle, or come apart under extreme strains or stresses in use. Its production is also rapidly accomplished, and in fabricating a complete mattress or cushion any desired number of wire springs may be united together.

Figure 3:
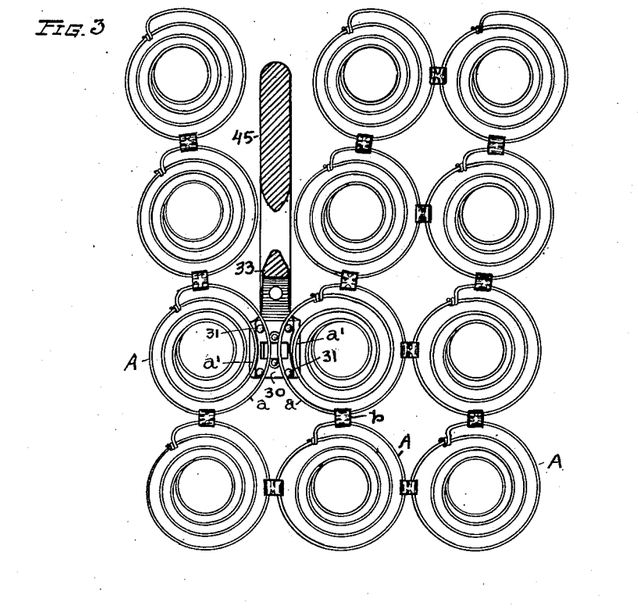
Fig. 3 is a horizontal section of the lower part of the machine on line 3—3 of Fig. 2, showing a bank of wire springs.
Figure 4:
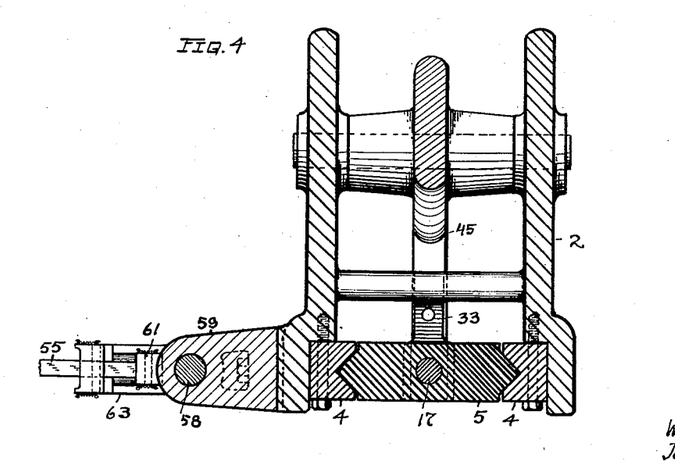
Fig. 4 is a horizontal section of the machine on line 4—4 of Fig. 1.

To exemplify, a series of coiled springs A may be attached to each other in a row by seating the springs successively in juxtaposition upon the lower clamping block, and operating the machine intermittently, a single clip being formed and attached and the wires indented at each stroke or cycle of movement hereinbefore described, and the metal tape or strip being fed automatically the requisite amount and distance to form a clip at each stroke. When a given number of springs are clipped together as described to form a row of springs of a given length, the same operation is repeated to produce a second row of springs united together in the same way, and so on until as many separate rows of springs are needed or desired. The separate rows of springs are now united to each other by aligning one row parallelly with another row on opposite sides of the lower clamping block 30 and the supporting arm 33 at the bottom of frame 2. Arm 33 and also oscillatory lever 45 is made relatively thin to permit the separate rows of springs to be brought into close juxtaposition and fed or passed forward together into paired seating position upon clamping block 30. All the complementary pairs of springs in the two rows are thus united together successively transversely or at right angles in respect to the attachment clips made in the first instance when uniting the springs longitudinally in a row. In Fig. 3 we show two short rows of springs clipped together at one side of block 30 and lever 45, and a third row of springs upon the opposite side. After each pair of juxtaposed springs is clipped together the complete assembly is fed forward to bring another pair of springs upon clamping block 30. A spring structure composed of only a few springs may be fabricated in this way; or a large number of springs may be joined together in the same way to produce a bed spring or a spring mattress. Straight border or tie wires may also be clipped together or to the springs by the same steps and means and when the spring loops on one side of the structure are united the assembly of springs may be bodily inverted and the spring loops on the other side may be clipped together in substantially the same way. To facilitate handling of relatively large spring structures, we may use a flat table or base B beneath the tilting jaw or foot of the machine upon which the springs may be shifted freely or placed at rest. The machine, viewed as a whole, is suspended above and apart from such a base or table to permit convenient handling and fabrication of the spring structure without check or interference. The machine could also be made to operate in an inverted position, the fabrication of the spring structure proceeding in that event above the whole machine instead of beneath it as in the present showing. Various other changes might also be made or equivalent devices used without departing from the spirit and scope of our invention or discovery and the teachings set forth herein and as distinctly pointed out in the following claims:

What we claim is:

1. A method of fabricating a spring structure, consisting in clamping separate wires of the spring structure in spaced juxtaposition and in affixing a connecting element to the juxtaposed portions of said wires by the application of an indenting pressure to said connecting element.

2. A method of fabricating a spring structure, consisting in placing separate wires of the spring structure in juxtaposition, in feeding a connecting element across the juxtaposed portions of said wires, and in uniting the respective ends of said element to each wire separately and segregatively.

3. A method of fabricating a spring structure, consisting in holding separate wires in juxtaposition; in severing blanks successively from a strip of metal; in forming clips automatically from said blanks, and in clenching separate marginal portions of the clips automatically to the circumference of each wire.

4. A method of fabricating a spring structure, consisting in fixing a pair of coiled wire springs in close juxtaposition and feeding a strip of metal across the juxtaposed portions of the springs and then severing a blank from said strip and wrapping said blank around said portions while jointly indenting said blank and the wires of said springs where wrapped.

5. A method of fabricating a spring structure, consisting in feeding a strip of metal automatically to shearing and clip forming devices, in cutting blanks from the strip successively, in forming clips from said blanks successively, and in automatically clenching the marginal portions of each clip to the wires.

6. A method of fabricating a spring structure, consisting in shearing a strip of metal into blanks and subsequently folding the opposite marginal portions of said blanks separately around independent wires spaced apart from each other and finally clenching the folded marginal portions separately to said wires.

7. A machine for forming a wire spring structure, comprising means for securing a clip to juxtaposed wires, including means adapted to interlock a marginal portion of the clip rigidly with one of the wires.

8. A machine for forming a wire spring structure, comprising automatic means for clenching marginal portions of a clip simultaneously about a plurality of wires, and segregating one wire from the other.

9. A means for fabricating spring structures, comprising spacing and holding devices for a pair of coiled springs, mechanism adapted to feed a strip of metal across juxtaposed portions of said springs, a cutter adapted to sever a blank from said strip, and a set of co-acting dies adapted to unite opposite ends of said blank to said springs.

10. A means for fabricating spring structures, comprising a set of co-acting members adapted to hold a pair of coiled springs in spaced relation, in combination with a set of co-acting dies adapted to form a metal clip and to affix the same to said springs.

11. A machine for forming a wire spring structure, comprising means adapted to curl marginal portions of a clip around segregated wires, including means adapted to produce a separating web portion between said curled portions.

12. A means for fabricating spring structures, comprising a set of co-acting devices adapted to affix metal tie members to the end loops of a pair of coiled wire springs, having associated means adapted to jointly upset the tie member and a portion of a wire spring into interlocking union.

13. A machine for fabricating spring structures, comprising a stationary member adapted to support a pair of coiled wire springs in juxtaposition having a yielding clamping member situated opposite thereto, and a set of co-acting dies associated with said members adapted to bend a metal clip around the juxtaposed portions of said wire springs.

14. A machine for fabricating spring structures, comprising associated clamping members having spacing and aligning means for holding the respective end loops of a pair of coiled springs in spaced juxtaposition in the same plane, means adapted to project a strip of metal between said members across juxtaposed portions of said end loops, and a set of shearing and clip-forming and attaching devices adapted to operate within said clamping members upon opposite sides of said strip and said juxtaposed portions.

15. A machine for fabricating spring structures, comprising a set of reciprocable clip-forming and clenching dies and associated means adapted to operate the same, means adapted to support the respective end loops of a pair of coiled wire springs in juxtaposition intermediate said dies, and automatic means adapted to feed a flat strip of metal intermittently between said dies across the juxtaposed portions of said loops.

16. A machine for fabricating spring structures, comprising a stationary support having associated means adapted to hold the respective end loops of a pair of coiled springs in spaced juxtaposition, a device adapted to feed a strip of metal across the end loops when seated upon said support, a shearing device and clip-forming dies movably confined within and opposite said support, and means adapted to effect co-operating movements of said device and dies to unite the end loops of said springs together with a clip formed by the dies.

17. A machine for fabricating spring structures, comprising a set of clamping holders for the respective end loops of a pair of coiled springs, a set of clip forming dies extending through said holders, means adapted to feed a metal blank between said dies, and an upsetting plunger extending through one of said dies.

18. A machine for fabricating spring structures, comprising a yieldable clamping holder for a pair of coiled springs, a shearing and forming die within said holder, means adapted to feed a strip of metal to said shearing and forming die, and a pair of movable die members adapted to co-act with said shearing and forming die in affixing a blank from said strip in connecting union with both springs.

19. A machine for fabricating spring structures, comprising means adapted to hold a pair of coiled wire springs in spaced juxtaposition, a device adapted to feed a tie element to the juxtaposed portions of said springs, opposed dies adapted to connect said element with said springs and a pivoted operating jaw for said dies adapted to upset said element.

20. A machine for fabricating spring structures, comprising a spacing holder for a pair of coiled wire springs, a set of reciprocable dies associated with said holder adapted to affix a clip connection to said springs, and means including a tilting upsetting jaw adapted to operate said dies.

21. A machine for fabricating spring structures, comprising a die and a movable support therefor carrying a spring-pressed clamping block adjacent said die, a stationary clamping block adapted to seat a pair of coiled wire springs in juxtaposition thereon, a set of pivoted die members movably supported within said stationary clamping block, and means adapted to introduce a connecting member for said springs between the opposed blocks and dies.

22. A machine for fabricating spring structures, comprising a movable support having a shearing die affixed thereto and a forming plunger extending through said die, a clamping block sleeved upon said die and spring-pressed to yield in clamping operation, a second clamping block adapted to seat a pair of coiled wire springs in juxtaposition opposite said first clamping block and die, a forming and upsetting die extending through said second clamping block, and means adapted to introduce a connecting element for said springs between said blocks and dies.

23. A machine for fabricating spring structures, comprising a slide and a cam adapted to operate same, a die fixed to said slide and a clamping member enclosing said die and spring-pressed to permit the die to project through said member, a stationary clamping member adapted to hold a pair of coiled wire springs in juxtaposition, a pair of pivoted dies and a movable holder therefor within said stationary clamping member, and a tilting lever operatively engaged with said holder and said cam.

24. A machine for fabricating spring structures, comprising a slide and a spring adapted to support said slide, a cam arranged to depress said slide, a die mounted upon said slide, means opposite said die adapted to support a pair of coiled wire springs in juxtaposition, means adapted to introduce a connecting element for said springs between said support and die, an upsetting device adapted to co-act with said die in affixing said element to said springs, and means operatively connected with said cam adapted to actuate said upsetting device.

25. A machine for fabricating spring structures, comprising a slide having a die member affixed thereto and a plunger extending through said die and a movable clamping block enclosing said die member, springs supporting said slide and plunger, a support for a pair of coiled wire springs beneath said movable clamping block, die members and a movable holder therefor opposite said plunger, a tilting lever operatively engaged with said holder, and a tilting lever engaged at one end with said cam and at its other end with said die holder.

26. A machine for forming a wire spring structure, comprising means for feeding a strip of metal, means for forming clips from the metal strip, and means for clenching the same about the wires of said spring structure.

27. A machine for forming a wire spring structure, comprising means for feeding a strip of metal, and die members adapted to form a clip from the metal strip and to affix the clip to the circumference of each wire separately.

28. A machine for fabricating a spring structure, comprising mechanism adapted to hold separate wires in fixed juxtaposition, in combination with automatic clip forming means, and automatic clenching devices adapted to clench the separate marginal portions of the clip to said wires.

29. A machine for fabricating a spring structure of wire, comprising separating devices for the wires, mechanism for feeding a strip of metal across the separated wires, means for severing a blank from said strip, and a clenching device adapted to curl the respective marginal portions of the severed blank segregatively around said separated wires.

30. A machine for fabricating a spring structure, comprising a device for supporting separate wires in the same plane, mechanism adapted to feed a metal strip across said wires, a cutter adapted to sever a blank from said strip, means adapted to produce a U-shaped clip from said severed blank, and mechanism for curling the respective marginal portions of the clip around the circumference of each wire to segregate the wires.

31. A machine for fabricating a spring structure, comprising means adapted to hold separate wires in spaced relation, a forming device adapted to produce a metal clip having flanges, and pressure devices adapted to curl the flanges around the wires separately and in segregation.

32. A machine for fabricating a wire spring structure, comprising spacing devices for the wires, means for shearing blanks successively from a strip of metal, means for forming each sheared blank into an open clip, and mechanism for closing the clip and segregating the wires fixedly therein.

33. A method of fabricating a spring structure, consisting in uniting a series of coiled springs to form a row of springs, in placing separate rows of springs parallelly in close relation in forming clips, and in clenching said clips to adjacent wires of the spring assembly to permanently segregate the rows of springs.

In testimony whereof, we have signed our names to this specification this 25th day of July, 1923.

WESLEY G. LEHMANN.
JOHN REIN.